March 12, 1940.  S. O. JAKOBSEN  2,192,974
PRESSURE LUBRICATOR
Filed Dec. 19, 1935      2 Sheets-Sheet 1

Inventor:
Svend Older Jakobsen,
By Horace S Woodward,
Attorney

March 12, 1940.　　　S. O. JAKOBSEN　　　2,192,974
PRESSURE LUBRICATOR
Filed Dec. 19, 1935　　　2 Sheets-Sheet 2
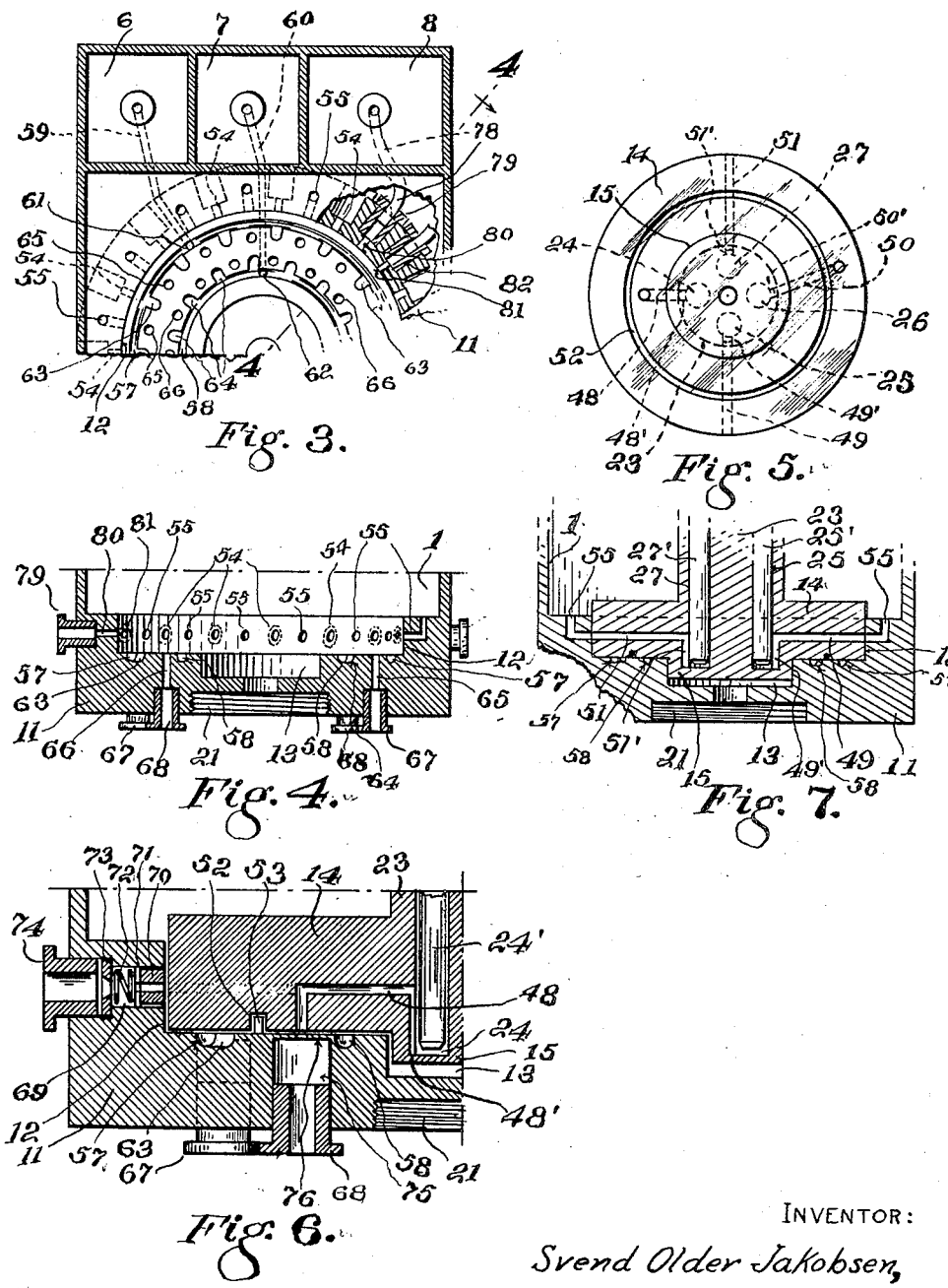
INVENTOR:
Svend Olger Jakobsen,
By: Horace S. Woodward
ATTORNEY.

Patented Mar. 12, 1940

2,192,974

UNITED STATES PATENT OFFICE 2,192,974

PRESSURE LUBRICATOR

Svend Older Jakobsen, Hoievarde, near Haugesund, Norway

Application December 19, 1935, Serial No. 55,286
In Norway October 5, 1934

15 Claims. (Cl. 184—35)

The present invention relates to a pressure lubricator comprising a common pump on a rotating valve disc feeding a multiplicity of lubricant delivering tubes.

A very important aim of the invention is to present such a structure in which the amount of lubricant supplied to the various tubes may be individually and selectively proportioned to the need of the particular mechanism being lubricated. It is also sought to meet special circumstances to which a lubricator must be adapted. Thus, in marine Diesel or steam engines some of the delivering tubes lead the lubricant to various points of application of lubricant having high pressure, while other tubes lead the lubricant to points having normal or low pressure. There will, therefore, not be the same demand on the pistons and valves feeding different tubes. The various points of application of lubricant also will require widely different kinds of lubricant and the lubricator will have to supply these points with the specific kind of lubricant in individually and selectively proportioned quantities.

A specific advantage of the invention is, that the pressure of the lubricant during the compression stroke will force the valve disc towards the valve seat so that tendency of the back-pressure of the lubricant in the discharge port to force the valve disc from the valve seat will be overcome.

Additional objects, advantages and features of invention reside in the construction, arrangement and combination of parts involved in the embodiment of the invention will appear from the following description and accompanying drawings, wherein:

Fig. 3 is a fragmentary plan of the valve seat.

Fig. 4 is a vertical section along the line 4—4 of Fig. 3.

Fig. 5 is the valve disc seen from the under side.

Fig. 6 is an enlarged vertical section through a part of the valve disc and the valve seat showing modifications of the parts of the valve seat.

Fig. 7 is a vertical section of the valve and seat at right angles to Fig. 1.

Figure 1:
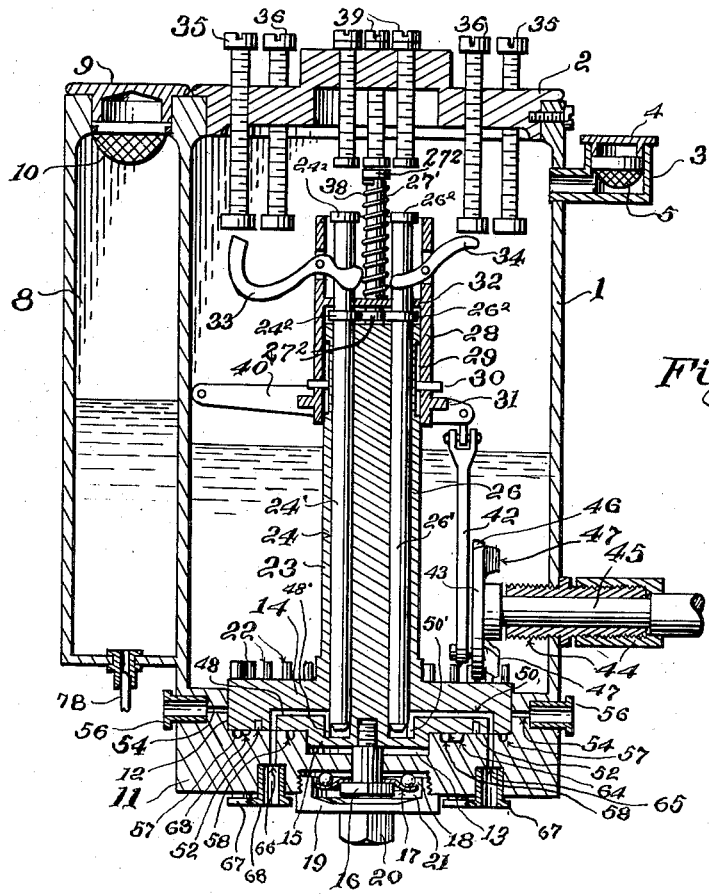
Fig. 1 is a side view of one embodiment of the invention with a vertical section along the line 1—1 of Fig. 2.
Figure 2:
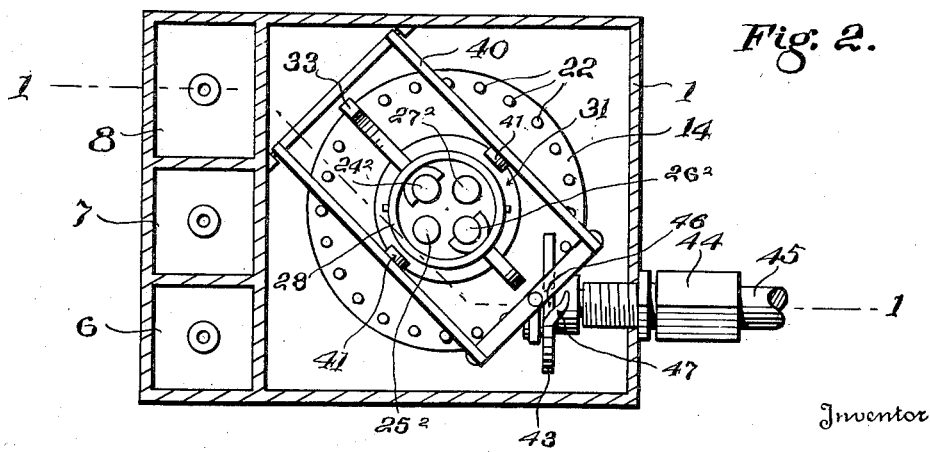
Fig. 2 is a plan view of the lubricator looking downward, the head of the casing being removed to show interior parts.

There is illustrated a lubricator unit adapted to be used for various kinds of machinery or for other purposes and adapted to be operated in any approved manner suitable to the particular use. It includes an outer casing 1 constituting a reservoir for lubricant having an upper closed head 2. The lubricant is introduced into the reservoir through an inlet 3 having a cover 4 and a filter 5 for dirt which might be in the lubricant.

On the exterior of the main casing 1 there are provided a desired number—in the present embodiment of invention three—additional reservoirs 6, 7 and 8 for other kinds of lubricant than that which is in the reservoir 1. The exterior reservoirs are provided with covers 9 and filters 10.

The lower end of the main casing 1 is closed by a head and valve seat 11, having a circular recess 12 formed with a cylindrical boundary wall and a planiform bottom seat face and centrally therein another circular recess 13 is formed. In the seat is placed a circular step-by-step rotating valve disc 14, which is received in the recess 12 and provided with a central boss 15, fitted in the recess 13 as a guide. The valve disc is retained in the seat by a screw 16 inserted through the bottom of the seat and accessible from the outer side. The screw head confines a spring and race 17 and ball-bearing 18, so that the valve disc is forced towards the seat with desired force. The screw 16 with spring 17 and bearing 18 are arranged in a recess 21 in the bottom of the head 11, which is closed by a cap 19 having a nut head 20 for unscrewing.

On the upper side of the valve disc near its periphery there are arranged crown pins 22, the number of which is dependent on the number of lubricant delivering tubes, which will be explained later.

On the upper side of the valve disc there is an upstanding multiple pump casing 23 the upper end of which stops short of the head 2 a substantial distance. In the present embodiment of the invention it has four cylinders 24, 25, 26 and 27 with pistons 24′, 25′, 26′ and 27′. The upper ends or stems of the later are each provided with two longitudinally spaced flanges 24², 25², 26² and 27² respectively, of which the lower ones are placed in such a manner that when the pistons are at the inner limit of their movement (which is a little short of the bottom end of the cylinder), these flanges rest on the top of the pump casing 23. The extreme bottoms of the cylinders are further below the level of the face of the valve disc.

The upper end of the pump casing is surrounded by an axially slidable sleeve 28, the pump casing being provided with longitudinal slots 29, in which there are engaged slidably spline pins 30 fixed on the sleeve.

The lower end of the sleeve has formed thereon a peripheral horizontal flange 31 and the sleeve midway of its height has a presser plate 32 having four holes, which register with the cylinder openings and through which the tops of the pistons are slidably inserted in such manner, that the plate 32 lies between the flanges on all pistons, and rests normally on the lower ones.

Beside the pistons 24' and 26' slots are cut in the sleeve in which are pivoted radial outwardly extending lever arms 33 and 34 respectively. The inner ends of these arms are forked and embrace the adjacent respective pistons and the outer extremities positioned to engage in succession a multiplicity of regulator screws 35 and 36 respectively set in the top cover 2. There is one screw for each lubricant delivering tube the pumps 24' and 26' are to feed and the screws are arranged in two concentric circles, as shown in Fig. 1. The arm 33, which is adapted to engage the outer circle of screws is U-formed in order not to engage the inner circle of screws, and the other arm is sufficiently shorter to engage only the inner circle of screws 36 during the rotation of the valve disc. The pumps operated by these lever arms are preferably used to feed the lubricant to places having approximately normal pressure.

The remaining pistons 25' and 27' are provided with springs as at 38 respectively, which are compressed between the upper flanges of the pistons and the plate 32 of the sleeve and tend to yieldingly hold the pistons in their highest position. The stems of these pistons are somewhat longer than the stems of the pistons 24' and 26' and are adapted to engage a number of regulator screws 39 arranged in a single circle in the center of the head 2. The pumps provided with springs 38 are preferably used to feed the lubricant to places having alternatingly high and low pressure.

The free ends of the regulator arms 33 and 34 and the tops of the pistons 25' and 27' pass from alinement with one of the regulator screws 35, 36 and 39 respectively to alinement with the next screw in the respective series, between the compression stroke and succeeding suction stroke of the pistons.

By adjusting the regulator screws the upward or suction stroke of each piston is limited. The succeeding correspondingly limited downward or compression stroke will force the desired amount of lubricant into the respective delivering tubes, so that each point of application of lubricant may receive lubricant in those individually and selectively proportioned quantities, which is needed in each instance.

On the interior of the main casing 1 there is pivoted a lever frame 40, which surrounds the pump casing 23 and the sleeve 28 and is provided with two lugs 41 between which the flange 31 is loosely disposed. At its end opposite the pivot, the frame has pivoted thereon a pitman 42 connected to a crank and cam wheel 43. The latter is pinned to a shaft 45 inserted through the casing 1 with a suitable stuffing device 44. By rotating the shaft 45, the crank wheel 43 is rotated, thereby raising and lowering the pistons for each rotation of the wheel.

Formed in the wheel 43 diametrically opposite each other and in line with the pitman connection on the wheel, there are two slots 46 opening on the periphery of the wheel. Laterally extending forwardly inclined teeth 47 are formed on the wheel beside the slots adapted to engage the pins 22 on the upper side of the valve disc. The valve disc will be moved one step, each time the pitman passes dead center. The crank wheel consists of a disc and is mounted in a plane parallel to the axis of the valve, but at an angle of substantially 45 degrees to the radius of the valve intersecting the vertical diameter of the disc so that the disc is located at an oblique angle to the adjacent portion of the path of the pins 22. The wheel is positioned with its lower edge in the path of the pins, and its thickness is sufficient for it to engage loosely between two pins, so that movement of the valve is prevented except when one of the teeth 47 engages a pin 22. The crank wheel is placed above the valve disc in such a manner that the moving impulse imparted by the wheel to the valve disc 14 substantially coincides with the plane of the valve disc, in order that the latter may be worn even along the under side.

In the valve disc there are passages 48, 49, 50 and 51, which have outlets to the cylinders a little way up from the bottom, being in effect continued by slots 48', 49', 50' and 51' respectively in the walls of the cylinders, extended to the extreme bottoms of the cylinders. This arrangement is provided in order to let air bubbles which might be in the lubricant escape before the lubricant is pressed into the passage.

From the cylinders 24 and 26 passages 48 and 50 respectively lead to the under side of the valve disc approximately opposite each other, being arranged in two geometrically projected circles concentric with the disc. From the cylinders 25 and 27 passages 49 and 51 respectively lead to the sides of the valve disc diametrically opposite each other and at the same level.

Between the passages 48 and 50 the under side of the valve disc is provided with a circular concentric slot in which is placed a stuffing ring 53, which rests on the valve seat to prevent leakage between the two passages.

On the cylindrical boundary wall of the valve seat there is a multiplicity of discharge ports 54 and inlet ports 55, of which the ports 54 lead to the outer side of the casing 1 there being provided with tube connections 56 for the delivering tubes, and of which the ports 55 lead up to the reservoir 1. Both sets of ports are alined with each other and positioned to register with the passages 49 and 51 in the valve disc.

In the planiform bottom of the face recess 12 in the valve seat there are cut two annular concentric grooves 57 and 58, which through passages or parts 61 and 62 and tubes 59 and 60 communicate with the reservoirs 6 and 7 respectively. Along these grooves at intervals dependent on movement imparted by the crank wheel, are cut lateral recesses 63 and 64 respectively constituting inlet ports, which are positioned to register with the passages 50 and 48 in the valve disc. Between the recesses and alined with same are discharge ports 65 and 66 respectively which lead to the under side of the valve seat there being provided with tube connections 67 and 68 respectively for the delivering tubes. These last named ports are positioned to register with the passages 50 and 48 respectively in the valve disc.

The ports and the recesses in the valve seat are positioned with respect to each other so that the passage 48 of the valve will then be brought into registration with inlet ports 64 and discharge ports 66 alternately at the same times that passage 50 is registered with inlet ports 63 and outlet ports 65; also the ports 49 and 51 register with two inlet ports 55 and two outlet ports 56 at the same respective times.

As it might be difficult to have the valve disc ground so accurately as to be received in the valve seat without leakage, detail of a spring valve arrangement is shown in Fig. 6. In radial discharge ports 69 for the lubricant are inserted small bushings 70 and stuffings 71 having a little hole of the same diameter as the passages in the valve disc. The bushing and the stuffing are forced yieldingly towards the valve disc by a spring 72 seated against a washer 73 screwed into the port 69, the latter further having a tube connection 74 for the delivering tubes.

By the spring 72 and the back-pressure of the lubricant in the delivering tube the bushing is forced towards the valve disc, thereby obviating any leakage which otherwise might occur.

Detail of another valve seat arrangement adapted to engage the under side of the valve disc, is shown in Figure 6. It consists of a port 75 on an axis parallel to that of the valve having a greatly enlarged diameter, and separated from the bottom face of the valve by a thin centrally apertured wall 76 forming a continuation of the planiform bottom seat face of the valve seat 11, although not necessarily integral therewith. When duplicated at the locations of the ports 66 and 65, the apertures in the walls 76 will register with the passages 48 and 50 respectively in the valve seat. The back pressure of the lubricant in the port 75 will press the wall 76 towards the under side of the valve disc, thereby preventing any leakage, which otherwise might occur. The port 75 is provided with a tube connection 68 for the delivering tubes.

From the reservoir 8 on the exterior of the main casing 1 leads a tube 78 to a tube connection 79 on the side of the valve seat with an inlet port 80 in the latter, so that in two positions of the valve disc lubricant is sucked from the reservoir 8, through the passages 49 and 51 in the valve disc. The lubricant is delivered through an adjacent discharge port 81 having a delivery tube connection 82.

The working of the lubricator is as follows: The shaft 45 is continually rotated in any approved manner, if desired with a transmission from the engine which is to be lubricated, so that when the latter works fast much lubricant is delivered to the various parts to be lubricated and when the engine works slower, less lubricant is delivered to the various points. When the engine is not working, no lubricant is delivered.

By the rotation of the shaft 45 the crank wheel 43, through the pitman 42 and sleeve 28, raises and lowers the pistons 25' and 27' simultaneously once for each rotation of the former, their upward movement being limited by the screws 39, so that the springs 38 yield while the sleeve moves further, and the pistons remain stationary. On lowering movement of the sleeve, after the plate 32 returns to the lower flanges 25² and 27² on the piston stems, the pistons are pressed downward by engagement of the plate and the flanges, expelling the lubricant from the respective cylinders. The pistons 24' and 26' are lifted by the inner ends of the lever arms 33 and 34 respectively, when the sleeve 28 is raised, after the outer ends of the levers have been stopped by the screws 35 and 36; and these pistons are pressed downward by engagement of the plate 32 upon their flanges 24² and 26² respectively during return of the sleeve 28 to lowermost position. Each time the pistons are in their highest position or in their lowest position respectively, one of the teeth 47 engages one of the pins 22 and moves the valve disc 14 one step, that is, two pins being engaged on each turn of the crank wheel.

During the upward or suction stroke of the pistons (while the valve disc remains stationary), the lubricant is sucked from the reservoir 1 through two inlet ports 55 in the valve seat and further through the passages 49 and 51 in the valve disc into the cylinders 25 and 27 respectively. At the same time lubricant from the reservoirs 6 and 7 through the tubes 59 and 60 is sucked through the inlet ports 61 and 62 respectively in the valve seat, where it is distributed in the concentric slots 57 and 58 respectively and the recesses 63 and 64 respectively and further sucked through the passages 50 and 48 respectively in the valve disc into the cylinders 26 and 24 respectively.

When the pistons have reached their highest position, viz: the height which is determined by the positions of the regulator screws 39 for pistons 25' and 27'; positions of screws 36 for piston 26', and positions of screws 35 for piston 24' respectively, they stop, so that the suction stroke of each piston may be individually and selectively proportioned by regulating the corresponding screw for each delivering tube.

In Fig. 1 the regulator screws 39 are screwed down to their lowest position, so that the pistons 25' and 27' will have no stroke at all.

In the operation of the device, the plate 32 will therefore simply compress the springs 38 without effecting any lifting of the pistons 25'—27' and on lowering movement of the sleeve 28, the plate 32 allows the springs to expand downwardly again. If one or more of the screws 39 are unscrewed from the position shown, when one of the pistons 25—27 is under such screws, as the sleeve rises, the spring 38 will lift the piston in its cylinder until the piston is checked by engagement with the screw, the plate then moving above the lower flange 25² or 27², and when the sleeve lowers, as soon as the plate 32 returns to the cleared lower flange it will press the flange and piston downward effecting the desired pumping action. The movement of the pistons 24' and 26' with the screws 35—36 in the positions shown is less than the distance from their lowered positions to the lowest position of the screws 39. As the sleeve 38 rises, the screws 35—36 will engage the outer ends of the levers 33 and 34, causing their inner ends to rise for a time without effect, but they engage the upper flanges 24² or 26² as the case may be finally, and so lift the respective pistons in the final upward movement of the sleeve. The lower flanges 24² and 26² are thus raised above the pump casing 23, and on return of the sleeve, the plate 32 engages these flanges and presses them downward to initial position, effecting the compression strokes of the pistons.

When the pistons are in their highest positions the valve disc is moved one step by the crank wheel, so that the regulator arms and the heads of the pistons 25' and 27' respectively move along under the regulator screws, whereafter the lubricant during the downward or compression stroke (while the valve disc remains positioned), from the cylinders 24 and 26 is pressed through the passages 48 and 50 respectively and further through the discharge ports 66 and 65 respectively into the delivering tube connections 68 and 67. At the same time the lubricant from the cylinders 25 and 27 is pressed through the passages 49 and 51 and further through the two registered discharge ports 54 into the delivering tubes except when passages 49 and 51 register with discharge port 81.

By this stroke three different kinds of lubricants are pressed to the various points of application of lubricant, so that each one may receive its special kind of lubricant. Pumps 25 and 27 in this instance both take from the reservoir 1, while pumps 24 and 26 take from the reservoirs 7 and 6 respectively.

In one position of the valve disc the passage 49 and eventually the passage 51 will register with the inlet port 89, which leads lubricant from the reservoir 8. The lubricant is sucked into the cylinders 25 or 27 according to the position of the passages 49 and 51 with respect to the port, whereupon the valve disc is moved one step and the lubricant from the reservoir 8 pressed through the discharge port 81. By this stroke four different kinds of lubricant are pressed to the various points of application of lubricant.

When the valve disc again is moved one step the lubricants are sucked from reservoirs 1, 6 and 7.

Those skilled in the art will see that the invention may be altered in different ways, and if desired there may be arranged more or fewer pumps than in the embodiment of invention shown, with consequent altering of the pumps and passages in the valve seat, within the scope of the invention.

What I claim is:

1. In a device of the character described, a valve seat having a face formed with a multiplicity of alternated inlet and outlet ports in a concentric series, means to supply liquid to the inlet ports, means to deliver liquid from the outlet ports individually, a valve revoluble on the seat having a port to register with those of the seat successively, means to rotate the valve step-by-step to register the port thereof successively with those of the seat at the intermissions of motion, a cylinder on the valve, connected with the valve port, a piston reciprocable therein, and means to operate the piston in synchrony with the intermissions of valve motion, consisting of a member reciprocable parallel to the piston, a lost motion connection between the reciprocable member and the piston having one limit coinciding with the full stroke position of the piston on compression, whereby the reciprocable member may move oppositely without engagement of the piston, a lever pivoted on the reciprocable member and having an arm extended adjacent the piston to swing in a plane coincident with the direction of reciprocation, a projection on the piston engageable by the arm when the reciprocable member is at an outer position, said lever having an arm projected beyond the reciprocable member and a plurality of stationary strike devices arranged in a series concentric with the axis of the valve and positioned to aline with the last named lever arm at respective positions of the valve and pump assembly, and means to adjust the strike devices longitudinally of the movement of the reciprocable member.

2. A pump and operating means comprising a cylinder, means to move the cylinder in an orbit with its axes vertical to the plane of the orbit, a piston therein having a stem part without the cylinder at full compression stroke, a member longitudinally slidable beside the cylinder in a fixed path with respect to the cylinder, a lever pivoted on the member having an arm projected toward the piston and having a lost motion engagement therewith, the lever having another arm extended oppositely, means to rotate the pump in said orbit step by step and to operate the sleeve at each step, a fixed support and a plurality of members mounted thereon with strike parts alined with the path of the second named arm in its orbital movement, and positioned in alinement with respective positions of said arm, and being adjustable longitudinally of the axis of the orbit and a separate lost motion connection between the slidable member and piston, one limit of which coincides with the limit of the compression stroke of the piston, and means to reciprocate the slidable member in synchrony with alinement of said strike parts and said second named arm, said support including a plurality of port elements in a series parallel to said orbit and spaced to coincide with the intervals of the step movement, and said cylinder having port means leading therefrom arranged to register with respective port elements of the support on each step movement.

3. In a pressure lubricator of the character described, a seat member a revolubly mounted valve and pump assembly thereon, the valve having a set of crown pins thereon concentric with its axis, and the pump comprising a cylinder on an axis parallel to the axis of rotation of the valve, and a reciprocating piston therein, a cam and crank wheel having a separate stationary mounting, means to rotate the wheel, said wheel being positioned to lie with its periphery across the orbital path of the crown pins, and having a transverse peripheral slot and lateral cam arm inclined to engage a pin and press the same through the slot under rotation of the wheel, and pitman connections between the wheel and piston, said valve having an eccentric port therethrough and said seat element having a plurality of ports therein adapted to register successively with the port of the valve on termination of respective step movements.

4. A pressure lubricator as described in claim 3, in which the said wheel is set with its plane parallel to the axis of rotation of the valve and at an acute angle to the immediately adjacent part of the path of the pins, the means to rotate the wheel being constructed to move the wheel periphery next the valve outwardly of the wheel and the cam arm being inclined to engage and propel the pins in the direction convergent toward the plane of the wheel and with a substantial component in the same direction as that of the engaged part of the wheel.

5. In a device of the character described, a valve seat having a face formed with a multiplicity of alternated inlet and outlet ports in a plurality of concentric series, a valve revoluble on the seat having a respective port for each said series of ports in the seat and positioned to register successively with those ports of the seat, means to rotate the valve to register its ports successively with those of the seat, a plurality of expansible chamber pumps connected with respective ports in the valve, means to operate the pumps for suction and compression in synchrony with respective registrations of the valve ports and seat ports, means to deliver liquid from the outlet ports individually, and a plurality of separate liquid reservoirs connected to respective inlet ports of the seat, whereby lubricants of different qualities may be delivered to respective points of application by a common pump.

6. In a device of the character described, a valve seat having a plurality of parallel concentric series of ports each series consisting of alternated inlet and outlet ports, a valve revoluble on the axis of said series and having at least one port for each of said series positioned to register with the ports of the respective series successively, means to rotate the valve, a respective expansible chamber pump connected with each port of the valve, whereby to alternately suck and expel liquid through successive ports of the seat, means to deliver liquid from the outlet ports, a plurality of supply ducts in the seat, a plurality of inlet ports in each series being commonly connected to respective ducts, and a respective liquid supply connected to each duct.

7. The structure of claim 5 in which a plurality of pumps is mounted on the valve, the means to operate the pumps comprising respective individual operative connections for certain pumps, whereby expansion of respective chambers may be in different ratios to the operating means, each pump having a respective port opening therefrom on the valve to register with ports of the seat, whereby lubricants of opposite extremes of viscosity may be delivered in charges of various quantities variable at will.

8. In a device of the character described, a valve seat having a plurality of alternated inlet and outlet ports disposed in group-relation about a definite axis; reservoir means for supplying liquid to said inlet ports; conduit means adapted for the transfer of liquid from said outlet ports; a valve mounted on said valve seat for step-by-step rotation about said axis and having a valve port adapted to register with one of said inlet ports incident to movement of said valve to one position of rest and to register with one of said outlet ports incident to movement of said valve to a succeeding position of rest; valve-actuating means for rotating said valve step-by-step whereby said valve port successively registers with said ports of said valve seat during successive periods of rest of said valve; a cylinder carried by said valve and communicating with said valve port; a piston reciprocable within said cylinder; piston-actuating means for effecting a suction stroke of said piston while said valve is at rest and while said valve port is in registration with one of said inlet ports and for effecting a discharge stroke of said piston during a succeeding period of rest of said valve and while said valve port is in registration with one of said outlet ports, said piston-actuating means including an actuating member movable with relation to said piston and adapted to be moved from a position corresponding to the innermost position of said piston to a position corresponding to at least the outermost position of said piston; adjustable means for limiting the outward movement of said piston during unobstructed further movement of said actuating member; and abutment elements associated respectively with said piston and said actuating member and adapted for cooperative engagement with each other incident to movement of said actuating member to a position corresponding to the innermost position of said piston whereby said piston is moved to its innermost position.

9. In a device of the character described, a valve seat having a plurality of alternated inlet and outlet ports disposed in group-relation about a definite axis; reservoir means for supplying liquid to said inlet ports; conduit means adapted for the transfer of liquid from said outlet ports; a valve mounted on said valve seat for step-by-step rotation about said axis and having a valve port adapted to register with one of said inlet ports incident to movement of said valve to one position of rest and to register with one of said outlet ports incident to movement of said valve to a succeeding position of rest; valve-actuating means for rotating said valve step-by-step, whereby said valve port successively assumes registration with said ports of said valve seat; a cylinder carried by said valve and communicating with said valve port; a piston reciprocable within said cylinder; piston-actuating means under the control of said valve-actuating means for effecting a suction stroke of said piston while said valve is at rest and while said valve port is in registration with one of said inlet ports and for effecting a discharge stroke of said piston during a succeeding period of rest of said valve and while said valve port is in registration with one of said outlet ports, said piston-actuating means including an actuating member movable with relation to said piston and adapted to be moved from a position corresponding to the innermost position of said piston to a position corresponding to at least the outermost position of said piston; adjustable means for limiting the outward movement of said piston during unobstructed further movement of said actuating member; and abutment elements associated respectively with said piston and said actuating member and adapted for cooperative engagement with each other incident to movement of said actuating member to a position corresponding to the innermost position of said piston whereby said piston is moved to its innermost position.

10. In a pressure lubricator of the character described; a seat member having a plurality of inlet ports and a plurality of outlet ports; a valve rotatably mounted on said seat member and having a valve port adapted to successively register with said ports of said valve seat; a set of pins carried by said valve and grouped about the axis thereof; a pump carried by said valve, said pump including a cylinder disposed longitudinally of the axis of said valve and communicating with said valve port and a reciprocating piston within said cylinder; a cam and crank wheel mounted for rotation adjacent said valve, said wheel having its periphery disposed in a plane intersecting the orbital path of said pins, said wheel having a transverse peripheral slot and provided adjacent said slot with a lateral cam arm adapted to successively engage said pins and move them through said slot incident to rotation of said wheel whereby step-by-step rotation is imparted to said valve and said valve port is caused to register with one of said inlet ports incident to movement of said valve to one position of rest and to register with one of said outlet ports incident to movement of said valve to a succeeding position of rest; and piston-actuating means operating incident to rotation of said wheel for effecting a suction stroke of said piston while said valve is at rest and while said valve port is in registration with one of said inlet ports and for effecting a discharge stroke of said piston during a succeeding period of rest of said valve and while said valve port is in registration with one of said outlet ports.

11. A pressure lubricator as described in claim 10, in which said plane is parallel to the axis of rotation of said valve and at an acute angle to a plane tangent to said orbital path of said pins where the first-mentioned plane intersects such path, and in which said cam arm is of such length as to move any given one of said pins through an arc equal to the arcuate distance from its center to the center of the next adjacent one of said pins.

12. In a device of the character described, a valve seat having a multiplicity of valve-seat inlet ports and a multiplicity of valve-seat outlet ports grouped about a definite axis and arranged in a plurality of series, in each of which series inlet ports and outlet ports are disposed alternately; a valve mounted on said valve seat for step-by-step rotation about said axis and having a plurality of valve ports (one for each series of said valve seat ports) adapted respectively to register with one of said inlet ports incident to movement of said valve to one position of rest and to register with one of said outlet ports incident to movement of said valve to a succeeding position of rest; valve-actuating means for rotating said valve step-by-step; a plurality of pumps connected respectively with said valve ports; pump-actuating means for effecting suction and discharge operation in synchrony with respective registrations of said valve ports with said inlet ports and said outlet ports; conduit means connected to said outlet ports and adapted to deliver liquid therefrom; and a plurality of separate liquid reservoirs respectively common to said inlet ports of each series of valve-seat ports, whereby different lubricants may be delivered to said conduit means by way of said outlet ports.

13. In a device of the character described; a valve seat having a plurality of series of ports, each series consisting of alternated inlet and outlet ports; a plurality of ducts respectively connected to a plurality of inlet ports of each series; a plurality of liquid reservoirs respectively connected to said ducts; a valve revoluble on said valve seat and having valve ports respectively positioned to successively register with the ports of said series; means to rotate said valve; expansible chamber pumps respectively connected with said valve ports, whereby to alternately suck and expel liquid through successive ports of said valve seat; and means to deliver liquid from said outlet ports.

14. A pressure lubricator comprising a valve seat having a plurality of series of alternated inlet and outlet ports disposed in group-relation about a definite axis, each series including at least one inlet port and at least one outlet port; reservoirs individual to said series of ports for supplying different liquids to said inlet ports; conduit means adapted to transfer liquid from said outlet ports; a valve mounted on said valve seat for step-by-step rotation about said axis and having a valve port adapted to register with one of said inlet ports incident to movement of said valve to one position of rest and to register with one of said outlet ports incident to movement of said valve to a succeeding position of rest; a pump communicating with said valve port and to which liquid is supplied from the respective inlet ports by way of said valve port and from which liquid is delivered through the respective outlet ports by way of said valve port; valve-actuating means for rotating said valve step-by-step whereby said valve port successively registers with said ports of said valve seat during successive periods of rest of said valve; and pump-actuating means cooperatively related to said valve-actuating means and operable, on the one hand, to effect suction operation of said pump during only such time as said valve is at rest and while said valve port is in registration with one of said inlet ports and operable, on the other hand, to effect discharge operation of said pump during only such time as said valve is at rest and while said valve port is in registration with one of said outlet ports.

15. A pressure lubricator comprising a valve seat having a plurality of series of alternated inlet and outlet ports disposed in group-relation about a definite axis, each series including at least one inlet port and at least one outlet port; reservoir means for supplying liquid to said inlet ports; conduit means adapted for the transfer of liquid from said outlet ports; a valve mounted on said valve seat for step-by-step rotation about said axis and having valve ports respectively adapted to register with an inlet port of said series incident to movement of said valve to one position of rest and respectively adapted to register with an outlet port of said series incident to movement of said valve to a succeeding position of rest; a plurality of pumps respectively communicating with said valve ports and to which liquid is supplied from the inlet ports of the respective series by way of the valve ports peculiar to the respective series and from which liquid is delivered to the outlet ports of the respective series by way of the valve ports peculiar to the respective series; valve-actuating means for rotating said valve step-by-step whereby said valve ports successively register with the ports of the respective series during successive periods of rest of said valve; and pump-actuating means cooperatively related to said valve-actuating means and operable, on the one hand, to effect suction operation of said pumps during only such time as said valve is at rest and while said valve ports are in registration with inlet ports of the respective series and operable, on the other hand, to effect discharge operation of said pumps during only such time as said valve is at rest and while said valve ports are in registration with outlet ports of the respective series.

SVEND OLDER JAKOBSEN.